(12) United States Patent
Roger

(10) Patent No.: US 7,761,611 B2
(45) Date of Patent: Jul. 20, 2010

(54) DESIGN METHOD FOR A DMA-COMPATIBLE PERIPHERAL

(75) Inventor: André Roger, Voreppe (FR)

(73) Assignee: STMicroelectronics S.A., Montrouge (FR)

( * ) Notice: Subject to any disclaimer, the term of this patent is extended or adjusted under 35 U.S.C. 154(b) by 40 days.

(21) Appl. No.: 11/328,729

(22) Filed: Jan. 10, 2006

(65) Prior Publication Data

US 2006/0288152 A1 Dec. 21, 2006

(30) Foreign Application Priority Data

Jan. 10, 2005 (FR) .................................. 05 00228

(51) Int. Cl.
*G06F 3/00* (2006.01)
*G06F 13/00* (2006.01)
(52) U.S. Cl. ................................. 710/8; 710/15; 710/52
(58) Field of Classification Search ........................ None
See application file for complete search history.

(56) References Cited

U.S. PATENT DOCUMENTS

| 5,687,357 | A | 11/1997 | Priem |
| 6,578,123 | B1 * | 6/2003 | Austin et al. ................. 711/165 |
| 7,003,638 | B2 * | 2/2006 | Brant et al. .................. 711/154 |

FOREIGN PATENT DOCUMENTS

| EP | 0 817 085 A1 | 1/1998 |
| WO | WO 00/52588 A1 | 9/2000 |

OTHER PUBLICATIONS

French Search Report from French Patent Application 05/00228, filed Jan. 10, 2005.
XILINX: "CoolRunner Serial Peripheral Interface Master" Dec. 13, 2002, XP002342030 Extrait de l'Internet: URL: http://direct.xilinx.com/bvdocs/appnotes/xapp348.pdf>.

* cited by examiner

*Primary Examiner*—Tariq R. Hafiz
*Assistant Examiner*—Scott Sun
(74) *Attorney, Agent, or Firm*—Lisa K. Jorgenson; James H. Morris; Wolf, Greenfield & Sacks, P.C.

(57) ABSTRACT

The invention relates to a method for organizing the registers of a peripheral in memory, the peripheral including at least one control register to be addressed in memory to store configuration data of the peripheral, one transmission register to be addressed in memory to store data to be transmitted from the memory to the peripheral, and one reception register to be addressed in memory to store data to be transmitted from the peripheral to the memory, the method including: duplicating, within a data memory range, the transmission/reception register to different contiguous addresses; and implementing in memory the control registers at contiguous addresses at the level of a memory range adjacent to the memory range where the transmission/reception register has been duplicated.

10 Claims, 2 Drawing Sheets

DESIGN METHOD FOR A DMA-COMPATIBLE PERIPHERAL

BACKGROUND OF THE INVENTION

1. Field of the Invention

The present invention generally relates to the field of communication with different peripherals in an information technology system.

More particularly, the present invention applies to the field of programmable integrated circuits of the type comprising a microprocessor, microprocessor peripherals and an interconnect bus to connect the peripherals to the microprocessor. In the context of the present invention, the term microprocessor peripheral signifies any programmable integrated circuit device separate from the central processing unit (microprocessor) to which it is linked and which may provide data input and output. In particular, it relates to peripherals that communicate with external system components.

2. Discussion of the Related Art

In the industrial domain, certain communication peripherals require the prior configuration of communications, which must be implemented before the communication is initiated. Typically, this step involves initializing peripheral control registers with data concerning speed, the number of bits per character transmitted or other types of information depending on the type of protocol used to access the peripheral.

For example, in the context of the SPI (Serial Peripheral Interface) protocol, a microcontroller is provided to communicate with several peripherals through a single serial link; each peripheral is connected to the SPI bus by a peripheral selection line, referred to as a "chip select" line, used to select one of several peripherals. Thus, before initiating a data exchange on the SPI bus with a peripheral, the microcontroller must first configure the chip select register of the peripheral with which it wishes to communicate. Other control registers relating, for example, to clock configuration information, may also be initialized during the data exchange.

In addition, within the context of the LIN (Local Interconnect Network) protocol, the LIN bus must also be configured before a communication with a LIN peripheral can begin. In particular, it is first necessary to send a header on the bus containing the features of the message, for example the number of octets to be transmitted, the transfer direction, etc.

Thus, before initiating a data exchange with this type of SPI- or LIN-compatible peripheral, a number of configuration operations must be implemented. This operating mode, therefore, makes this type of peripheral unsuitable for system architectures intended for sending data directly from a peripheral to the memory, or from the memory to the peripheral, using a DMA (Direct Memory Access)-type controller, which makes it possible to directly access the memory without going through the processor.

In fact, in this context of direct transfer, as shown in FIG. 1, the microprocessor 1 first initializes the DMA communication by sending the DMA controller 2 the transfer starting address, the length of the data and the transfer direction, and then it launches the transfer. The DMA controller 2 then takes control of the memory 5 and the input/output controller 3 of the peripheral 4. The data transfer can then be performed without going through the processor.

However, the DMA controller is not intended to perform the initialization operations of the peripheral control registers, which must be configured before initiating any exchange of data.

In fact, direct access transfer to the memory allows a peripheral to "borrow from the memory" of the system in order to use it as a buffer zone, that is, as a temporary storage area, thereby making it possible to rapidly save data as they are input or output. To do so, a memory location, tagged by a starting address and an end address, is assigned to the peripheral so it can exchange data with the system according to the method for directly accessing the memory, without involving the microprocessor.

According to the example in FIG. 2, a communication peripheral therefore has registers R0 to R4, implemented at fixed memory addresses. Registers R0, R1 and R3 are intended to be control registers that must be configured before initiating a data exchange. For example, register R0 is a register containing the bit rate information, register R1 is a register containing the "chip select" information, and register R3 is a register containing the clock configuration information. Register R2 is the data transmission register and register R4 is the data reception register. These registers are implemented at fixed memory addresses.

Moreover, as also shown in FIG. 2, when the DMA controller implements a DMA data transfer from the memory to a peripheral, the transfer is typically performed from variable memory addresses: address_i, address_i+1, . . . , which self-increment (or self-decrement), to a fixed memory address corresponding to the address of the peripheral transmission register R2.

Therefore, it is clear that it is impossible for the DMA controller to collect, in one single operation, the initialization phase for the peripheral control registers and the actual phase of data transfer to the transmission register. In fact, the initialization phase for control registers R0, R1 and R3 of the peripheral 4 forces pointing to memory addresses, which are not contiguous. However, the DMA controller is unable to perform such an operation. The standard DMA controller is only intended to perform a variable address transfer to a fixed address from the memory to the peripheral or a fixed address (corresponding to the address of reception register R4) transfer to variable memory addresses that will be incremented, from the peripheral to the memory.

Since the peripheral control registers are stored to non-sequential addresses, establishing a data exchange with this type of peripheral whose control registers must first be initialized involves additional preliminary work by the main processor to initialize these registers before the relay can be passed to the DMA controller for the actual data transfer. Performance, in terms of processor usage time, is thus degraded by this preliminary step of control register initialization carried out by the processor.

SUMMARY OF THE INVENTION

Therefore, one object of the invention is to provide a method for making communication peripherals, whose registers need to be configured before initiating a data exchange, compatible with DMA data transfer architecture by finding solutions to the aforementioned drawbacks.

To attain this and other objects, the invention provides for a method to organize in memory the registers of a peripheral, said peripheral comprising at least one control register to be addressed in memory in order to store configuration data of said peripheral, one transmission register to be addressed in memory in order to store data to be transmitted from the memory to said peripheral and one reception register to be addressed in memory in order to store data to be transmitted from the peripheral to the memory, said method comprising:

duplicating, within a given memory range, said transmission/reception register to different contiguous addresses; and implementing in memory said control registers to contiguous addresses at the level of a memory range adjacent to the memory range where the transmission/reception register has been duplicated.

According to one embodiment, the control registers are implemented in memory before the memory range where the transmission/reception register has been duplicated.

According to one variant, the control registers are implemented in memory after the memory range where the transmission/reception register has been duplicated.

Preferably, the control registers are implemented in memory according to a decreasing order of usage in relation to the memory range where the transmission/reception register addresses are duplicated, as use of a control register is defined by how frequently it is addressed.

Preferably, the number of duplications in memory of the transmission/reception register depends on the type of communication protocol associated with the peripheral.

Fortunately, duplication of the transmission/reception register in memory is the result of a partial decoding of the data addresses to be stored, as partial decoding preferably involves ignoring low-weight addresses.

According to one embodiment, the method includes preparing, in memory, a data structure comprising the peripheral configuration data and the data to be transmitted from the memory to said peripheral, and implementing an operation to transfer said data to the peripheral registers implemented in memory according to an incremental DMA mode from variable addresses of the data of said structure to the variable addresses of the different peripheral registers, the initialization phase of the peripheral control registers being completed during said DMA transfer operation.

The invention also relates to an electronic circuit comprising a microprocessor linked to at least one peripheral through an interconnect bus, wherein said microprocessor comprises means for implementing the method according to the invention.

For example, the peripheral is an SPI- or LIN-type peripheral.

BRIEF DESCRIPTION OF THE DRAWINGS

The features and advantages of the present invention will become clearer upon reading the following description provided as an example only and in which reference is made to the appended figures wherein.

DETAILED DESCRIPTION

A principle on which the present invention is based first includes, during the peripheral design phase, implementing in memory several times from a given starting address, the transmission/reception register of the communication peripheral. In other words, the peripheral transmission/reception register is duplicated n times within a given memory range to multiple, contiguous, and different physical memory addresses. Therefore, it is no longer implemented in memory to one fixed address. The number of duplications of the physical addresses of the transmission/reception register will depend on the type of peripheral implemented. For example, within the context of the LIN protocol, where the messages transmitted between the peripheral and the memory currently comprise 8 octets, the peripheral transmission/reception register will be duplicated 8 times in memory to different and contiguous physical addresses.

The other principle on which the invention is based comprises organizing the peripheral control registers appropriately by modifying the method of matching these control registers of the communication peripheral with the physical addresses in memory. These control registers can thereby be implemented in memory to contiguous addresses at the level of a memory range adjacent to the memory range where the transmission/reception register has been duplicated. The control registers are preferably implemented before the transmission registers. In one operational variant, they can also be implemented after the transmission registers.

In this manner, with such an implementation in memory of the peripheral registers, a standard DMA controller will be able to transfer a set of data from the memory to the communication peripheral, while also passing the configuration information of the peripheral control registers during the same transfer operation.

To initialize the communication, the microprocessor must merely prepare in memory a data structure comprising the configuration data of the control registers and the data of the message to be transmitted to the peripheral transmission registers, and then give the command to the DMA controller to perform the transfer of this data structure to the peripheral registers implemented in memory according to the principles of the invention.

The role of the DMA controller is then to write the pre-established data structure in the peripheral registers implemented in memory according to an incremental transfer mode, from incremental variable memory addresses of the data structure to the incremental variable memory addresses corresponding to the different peripheral registers.

Figure 1:
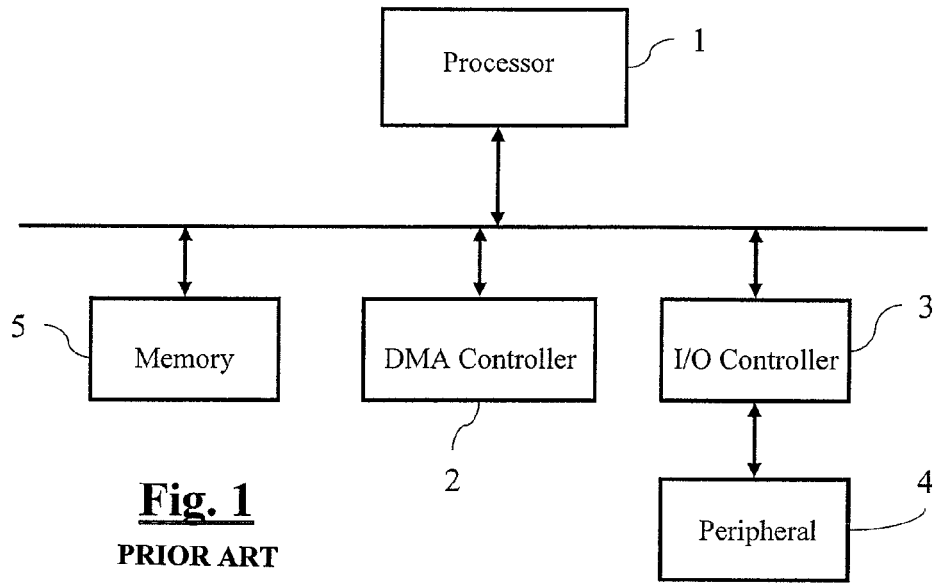
FIG. 1 schematically shows an architecture for data transfer through DMA-type direct transfer, and has previously been described.
Figure 2:
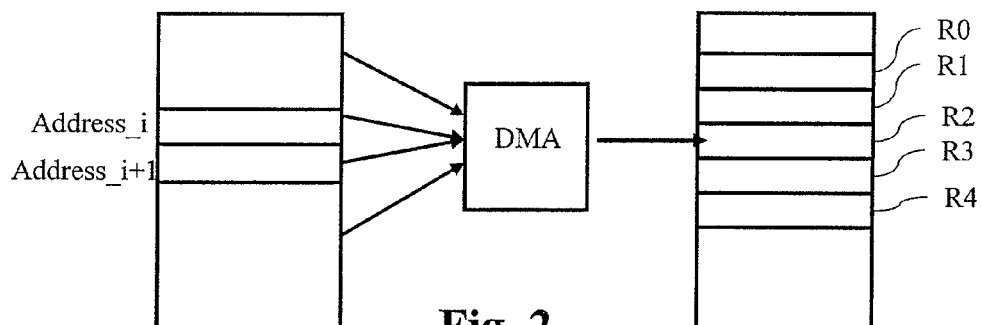
FIG. 2 schematically shows a conventional concept for a DMA-type data transfer to the registers of a peripheral, and has previously been described.
Figure 3:
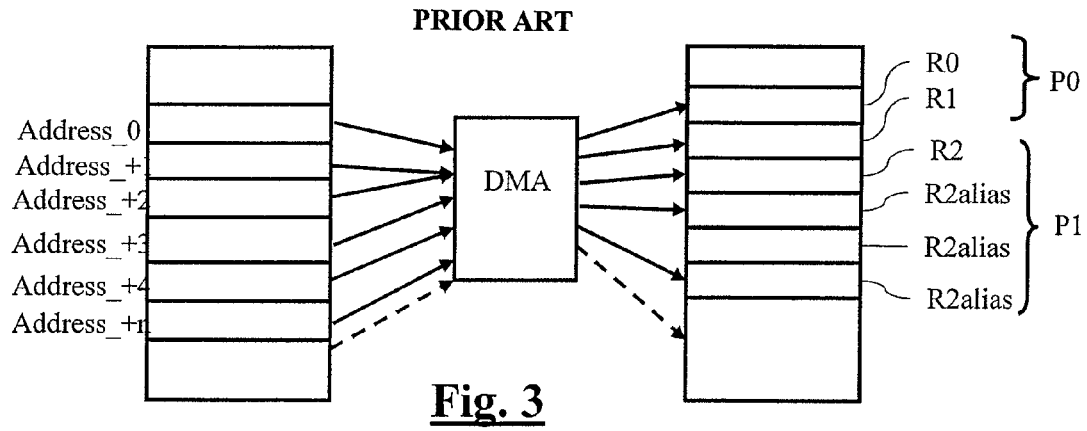
FIG. 3 schematically shows a DMA-compatible data transfer from the system's working memory to the registers of a peripheral implemented in memory according to the present invention.

This method is described in more detail in FIG. 3 which shows such a DMA-compatible data transfer from the system's working memory to the registers of an SPI-type peripheral implemented in memory according to the present invention. FIG. 3 therefore shows the memory dump of the data structure prepared by the processor. This data structure starts at memory address address_0 and ends at memory address address_+n. Each piece of data, for example, is encoded using eight bits.

FIG. 3 also shows the memory dump of the peripheral with the implementation in memory, as explained above, of its control registers, for example R0 and R1, at the level of a first memory range P0 and of its transmission register R2, which is duplicated to several different and contiguous physical addresses at the level of a second memory range P1. Therefore, each of these different addresses correspond to the duplicated transmission register R2alias of the peripheral. Moreover, the control registers are implemented at addresses that are sequential in relation to the transmission registers and the memory range P0 is adjacent to the memory range P1 where the transmission registers are implemented. For example, the peripheral registers are encoded using eight bits.

According to the example in FIG. 3, there is a first control register R0, implemented at a given memory address, for information on the bit rate and the clock configuration, and a second control register R1 implemented at a memory address incremented by one, for example, in relation to the memory address of the first control register, for the "chip select" information, making it possible to define which SPI peripheral is addressed on the bus.

According to one embodiment, different levels of control register can be defined. Thus, the control registers are preferentially implemented in memory according to a decreasing order of importance or usage, depending on the frequency of their addressing, in relation to the memory range where the transmission register addresses are duplicated, as shown in the example of FIG. 3 where register R1 is first implemented at an address adjacent to the duplicated addresses of the transmission register, then register R0. In fact, certain control registers will need to be initialized each time a message is transferred. This is the case particularly within the context of the SPI example, for the "chip select" register R1, which must always be configured between two transfers to select another peripheral or to confirm that the same peripheral is selected. On the other hand, transfer speed does not always need to be reconfigured each time a transfer is completed if it is identical for all the peripherals and thus register R0 is not necessarily reinitialized and its value can be reused.

Using the data structure previously prepared by the processor, the DMA controller will then perform, for each piece of data encoded respectively to starting memory address address_0 up to incremental address address_+n, a data transfer operation to the peripheral registers implemented in memory. Implementing this data transfer step comprises, more specifically, of decoding an address, an example of which will be given below.

Thus, the data encoded to memory address address_0, which comprises a clock and bit rate configuration word, is transferred to the memory address corresponding to the first control register R0. Then, the data encoded to the next incremented memory address address_+1, which comprises a "chip select" configuration word, is transferred to the memory address corresponding to the second control register R1. The initialization phase for the control registers is therefore completed by the DMA controller.

Next, the DMA transfer continues and the transfer of data from the message to be transmitted to the peripheral begins. Thus, the first piece of data from the message to be transmitted, encoded to the next incremented address (address_+2), is transferred to the corresponding address of transmission register R2, the second piece of data from the message to be transmitted, encoded to the next incremented address (address_+3), is transferred to the corresponding address of the first duplicated transmission register (R2alias) and so on up to the last piece of data from the message to be transmitted, encoded to the address address_+n, which is transferred to the corresponding address of the last duplicated transmission register (R2alias).

The transfer, as just described in reference to FIG. 3, leads to two types of address decoding. Thus, there is a first type of address decoding for the multiple decoding of the transmission register which is duplicated to several different physical addresses and a second type of address decoding for decoding control registers implemented in memory before (or after according to one variant) the transmission registers. These decodings are performed by logic gates as shown in FIG. 4.

Figure 4:
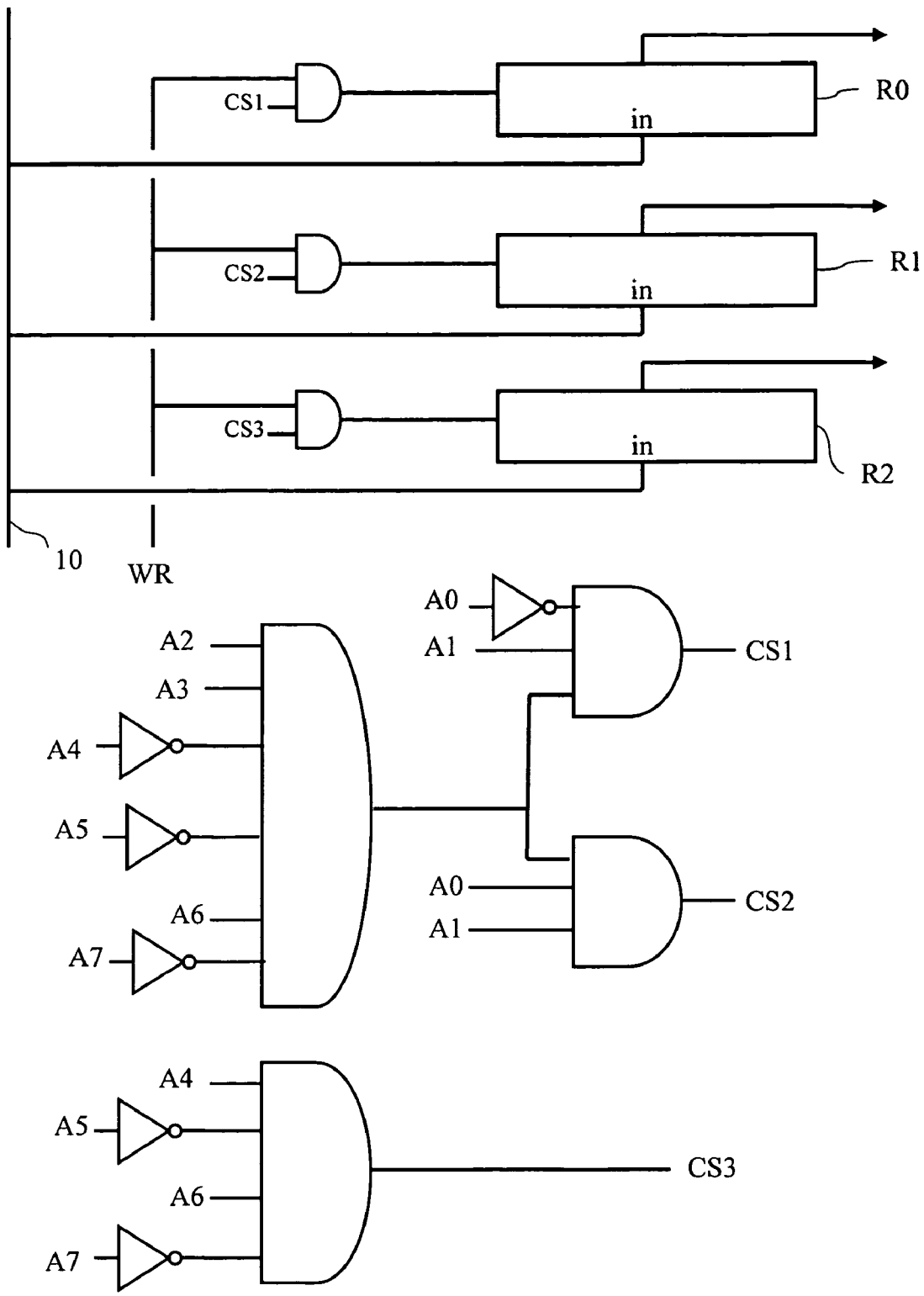
FIG. 4 describes an example of address decoding that can be implemented within the context of DMA transfer in FIG. 3.

FIG. 4 thus describes an example of address decoding that can be implemented within the context of the DMA transfer of FIG. 3. Each register R0, R1 and R2 is represented respectively by a latch D, linked at its entry point in to a data bus 10. Register R0 is controlled by a gate ET receiving, on its respective entry points, the write command signal WR and the address signal CS1 corresponding to the decoded address of control register R0. R1 is controlled by a gate ET receiving, on its respective entry points, the write command signal WR and the address signal CS2 corresponding to the decoded address of control register R1. Finally, transmission register R2 is controlled by a gate ET receiving, on its respective entry points, the write command signal WR and the address signal CS3 corresponding to the multiple decoded addresses of transmission register R2.

A network of gates ET, receiving on their respective entry points address signals A0, A1, A2, A3, A4, A5, A6, A7 of the data to be transmitted via the data bus 10 to the different peripheral registers, is implemented to ensure that addresses CS1, CS2 and CS3 of the different registers are decoded. According to the example in FIG. 4, decoded address CS1 corresponding to control register R0 is 01001110 and address CS2 corresponding to control register R1 is incremented by 1 and is 01001111. Addresses CS3, corresponding to the various addresses of the duplicated transmission register, is the result of a partial decoding of addresses A4 to A7, by ignoring the low-weight addresses, from A0 to A3. Addresses CS3 are therefore of the 0101xxxx form. Transmission register R2 is thus duplicated in memory to the next respective addresses 01010000, 01010001, . . . , 01011111. In this manner, transmission register R2 is duplicated in memory several times starting with address 01010000 and control registers R0 and R1 are implemented in memory at respective addresses 01001110 and 01001111 that are sequential in relation to the addresses of register R2.

Thus, duplicating in memory the transmission register at different contiguous physical addresses and specially organizing the control registers, which are implemented at addresses that are sequential in relation to the duplicated transmission registers, allow the transfer of the data to be transmitted to the peripheral according to one incremental DMA mode from variable memory addresses to incrementing variable memory addresses; the initialization phase of the control registers can also be implemented during the same transfer operation by the DMA controller. This favorably frees processor usage time while continuing to use a basic DMA controller.

Moreover, such an operational mode of the basic DMA controller within the context of the present invention normally goes against the memory/peripheral transfer principles according to which transfers are typically completed from variable addresses to a fixed address (corresponding to the address of the transmission register). A transfer from variable addresses to variable addresses, made possible by duplicating in memory the transmission register, is usually used within the context of memory/memory transfers, and not within the context of memory/peripheral transfers.

Fortunately, due to the fact that the initialization phase of the control registers may be completed at the same time as the DMA transfer, one can consider adding more intelligence within the peripheral in view of guaranteeing, for example, DMA transfer security. For example, a control register could be added to define the number of characters to be transmitted in the message. Then, the controller could initialize this register before starting to write the transmission registers Moreover, if the description has been made essentially by referring to the peripheral transmission register within the context of transfer from the memory to the peripheral, the design principle of a peripheral according to the invention could be used within the context of transfer from the peripheral to the memory. In this case, it is the reception register, which is duplicated to store the data from the peripheral to the memory before the data are read. Therefore, two DMA channels must be used. A first DMA channel will be used for the initialization phase during which configuration data will be written in the control registers and a second channel will be used for the reception phase, to be used to read the contents of the peripheral reception register duplicated in memory according to the principle of the invention. The two channels can then be chained.

Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A method for organizing, in memory, the registers of a peripheral, said peripheral comprising at least one control register to be addressed in memory to store configuration data of said peripheral and a data register to be addressed in memory to store data to be transmitted from the memory to said peripheral or data to be transmitted from the peripheral to the memory, said method comprising:
   providing, within a given data memory range, the data register at a plurality of contiguous addresses, wherein the data register is provided both at a first address and at a second address different from the first address, the first and second addresses being adjacent; and
   implementing in memory said control registers at contiguous addresses at a level of a memory range adjacent to the memory range where the data register has been provided.

2. The method according to claim 1, wherein the control registers are implemented in memory before the memory range where the data register has been provided.

3. The method according to claim 1, wherein the control registers are implemented in memory after the memory range where the data register has been provided.

4. The method according to claim 1, wherein the control registers are implemented in memory according to a decreasing order of usage in relation to the memory range where the data register is provided, wherein the usage of a control register is defined by the frequency of its addressing and a less frequently addressed control register is implemented farther away from the memory range where the data register is provided than a more frequently addressed control register.

5. The method according to claim 1, wherein the number of times the data register is provided in memory depends on the type of communication protocol associated with the peripheral.

6. The method according to claim 1, wherein providing the data register in memory results from a partial decoding of data addresses which must be stored.

7. The method according to claim 6, wherein the partial decoding comprises ignoring low-weight addresses.

8. The method according to claim 1, comprising preparing, in memory, a data structure comprising the peripheral configuration data and the data to be transmitted from the memory to said peripheral, and implementing a transfer operation of data of said data structure to the peripheral registers that have been implemented in memory, according to an incremental DMA mode from variable addresses of the data of said data structure to variable addresses of the different peripheral registers, wherein the initialization phase of the peripheral control registers is completed during said DMA transfer operation.

9. An electronic circuit comprising a microprocessor linked to at least one peripheral through an interconnect bus, wherein said microprocessor comprises means for implementing the method of claim 1.

10. An electronic circuit according to claim 9, wherein the peripheral is an SPI- or LIN-type peripheral.

* * * * *